United States Patent [19]
Ciemochowski

[11] 3,746,986
[45] July 17, 1973

[54] METHOD OF AND CIRCUIT MEANS FOR DETECTING AND RESPONDING TO RATE OF CHANGE OF SPEED

[75] Inventor: Michael F. Ciemochowski, Warren, Mich.

[73] Assignee: Holley Carburetor Company, Warren, Mich.

[22] Filed: Aug. 30, 1971

[21] Appl. No.: 175,862

[52] U.S. Cl. ................ 324/162, 324/78 Q, 340/262
[51] Int. Cl. ........................ G01r 23/02, G01p 3/42
[58] Field of Search ........................ 324/162, 78 Q; 340/62, 262; 317/5; 307/121; 303/21 CG

[56] References Cited
UNITED STATES PATENTS

| | | | |
|---|---|---|---|
| 3,625,572 | 12/1971 | Marouby | 324/162 X |
| 3,153,746 | 10/1964 | Atkinson | 324/78 Q |
| 3,469,662 | 9/1969 | Dewar | 324/162 X |
| 3,615,120 | 10/1971 | Yamazaki et al. | 324/162 X |

*Primary Examiner*—Alfred E. Smith
*Attorney*—Walter Potoroka, Sr.

[57] ABSTRACT

A method of sensing and creating an output to the rate of change of speed includes creating an electrical pulse in timed relationship to the parameter of speed, amplifying the pulse and electrically shaping it to approach a more nearly squared configuration, using the shaped pulse to cyclically switch related switching means to and from a conductive state in order to develop a related saw-tooth like output voltage, electrically averaging the output voltage and employing same for an indication of the then value of speed, applying the output voltage to two electrically responsive sensing means, and preventing one of the sensing means from responding to the output voltage whenever a change in the parameter of speed occurs while permitting the other sensing means to respond thereby creating a triggering voltage to control the action of an output switch in that the output switch becomes responsive to such a condition of change of speed.

19 Claims, 7 Drawing Figures

METHOD OF AND CIRCUIT MEANS FOR DETECTING AND RESPONDING TO RATE OF CHANGE OF SPEED

APPARATUS

A pulse generator operated in accordance with the parameter of speed electrically drives pulse amplifying and shaping transistors which create an output to a tachometer circuit including a pulse averaging transistor and resistance means; the voltage of the pulse average is supplied to related comparator or differential amplifier circuit means effective for preventing an output therefrom during quiescent or steady state operation but effective for producing an output whenever a change in speed from such steady state operation is detected.

BACKGROUND OF THE INVENTION

Various means and devices have heretofore been proposed, by the prior art, to measure and/or respond to a parameter of rate of change in speed. However, such prior art devices have been found costly to produce and often unreliable in performance.

Accordingly, the invention as herein disclosed and described is primarily concerned with the solution of the above as well as other related problems.

SUMMARY OF THE INVENTION

According to the invention, a method of detecting and responding to the rate of change of speed comprises the steps of creating an electrical pulse in timed relationship to the parameter of speed, amplifying the pulse and electrically shaping it to approach a more nearly squared wave form configuration, using the shaped pulse to cyclically switch related switching means to and from a conductive state in order to develop a related saw-tooth like output voltage, electrically averaging the output voltage and employing it for an indication of the then value of speed, applying the output voltage to two electrically responsive seansing means, and preventing one of the sensing means from responding to the output voltage whenever a change in the parameter of speed occurs while permitting the other sensing means to respond thereto thereby creating a triggering voltage to control the action of an output switch so that the output switch becomes responsive to such a condition of change of speed.

According to the invention, apparauts for practicing the above inventive method comprises a pulse generator operated in accordance with the parameter of speed for electrically driving pulse amplifying and shaping transistors which create an output to a tachometer circuit including a pulse averaging transistor and resistance means, and differential amplifier means for receiving the voltage of the pulse average, said differential amplifier means being effective for preventing an output therefrom during quiescent or steady state operation but effective for producing an output whenever a change in speed from such steady state operation is detected.

Various general and specific objects and advantages of the invention will become apparent when reference is made to the following detailed description considered in conjunction with the accompanying drawings.

DESCRIPTION OF THE PREFERRED EMBODIMENT

Figure 1:
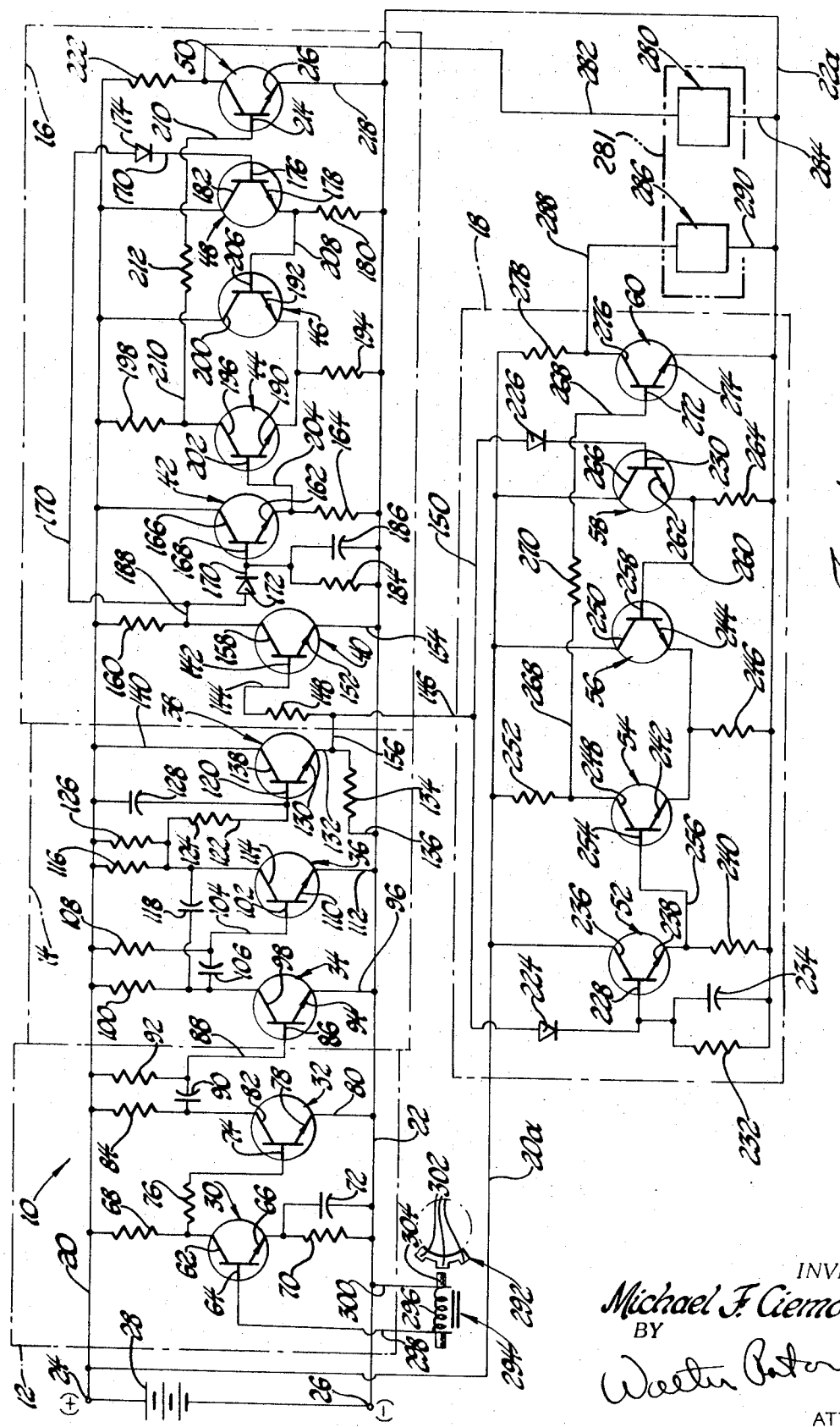
FIG. 1 is a schematic wiring diagram illustrating the preferred embodiment of the invention.
Figure 2:
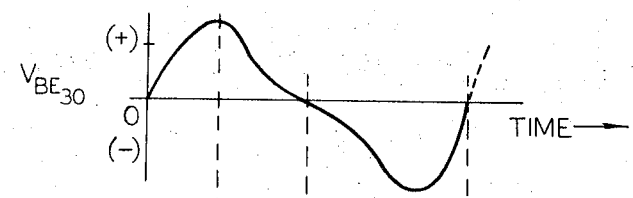
FIGS. 2, 3, 4, 5, 6 and 7 illustrate, graphically, the characteristic operating curves of certain of the elements within FIG. 1.
Figure 3:
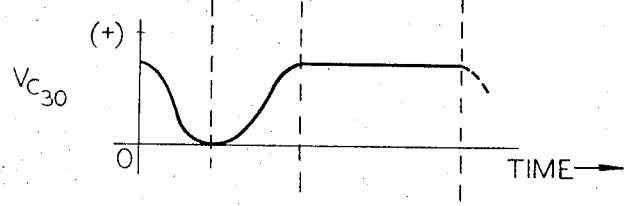
Figure 4:
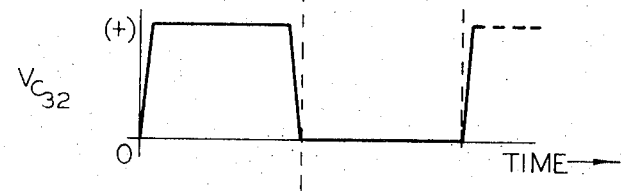
Figure 5:
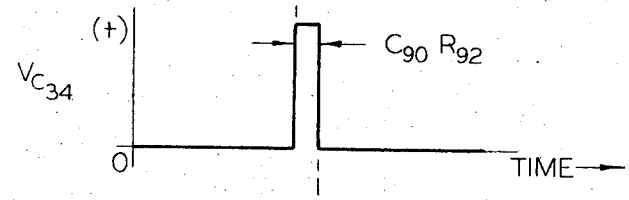
Figure 6:
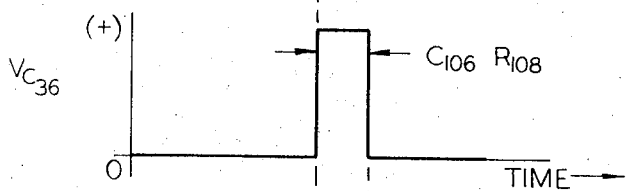

Referring now in greater detail to the drawings, FIG. 1, illustrates circuit means 10 which can be considered as being comprised of four functionally different sections, as generally defined by the box-like enclosing dash lines 12, 14, 16 and 18 the operation of which will be described later.

Generally, circuit means 10 is illustrated as comprising first and second main conductor means 20 and 22 which may, in turn, have terminals 24 and 26 adapted for connection to a suitable source of electrical potential 28. Section 12 comprises a plurality of transistors 30 and 32; section 14 is provided with transistors 34, 36 and 38; section 16 has transistors 40, 42, 44, 46, 48 and 50 while section 18 comprises transistors 52, 54, 56, 58 and 60.

Transistor 30 includes a collector electrode 62, emitter electrode 66 and a base electrode 64 with the collector 62 being electrically connected to conductor 20 via a serially situated resistor 68. The emitter 66, somewhat similarly, is electrically connected to conductor 22 as through a series with a resistor 70. A capacitor 72 has one side connected to conductor 22 while its other side is connected to a point as between emitter 66 and resistor 70.

Transistor 32 has a base terminal 64 connected in series with a resistor 76 which, in turn, is connected generally to collector 62 of transistor 30 as at a point between the collector 62 and resistor 68. An emitter electrode 78 of transistor 32 is connected as by conductor 80 to conductor 22 while the collector electrode 82 is connected to conductor 20 through a series resistor 84.

Transistor 34 has its base electrode 86 connected, via conductor 88, to one side of a capacitor 90 which, in turn, has its other side connected generally to collector 82 of transistor 32 as at a point between resistor 84 and collector 82. Base conductor 88 is also connected to conductor 20 as through a resistor 92. Emitter 94 of transistor 34 is connected to conductor 22 via conductor 96 while the collector electrode 98 is connected to conductor 20 through a series resistor 100.

Transistor 36 has its base electrode 102 connected, via conductor 104, to one side of a capacitor 106 which, in turn, has its other side connected generally to collector 98 of transistor 34 as at a point between resistor 100 and collector 98. Base conductor 104 is also connected to conductor 20 as through a resistor 108. Emitter 110 of transistor 36 is connected to conductor 22 via conductor 112 while the collector electrode 114 is connected to conductor 20 through a series resistor 116. A capacitor 118 is so arranged as to have one side thereof connected to collector 98 as at a point between collector 98 and resistor 100 while its other side is connected as at a point between resistor 116 and collector 114.

Transistor 38 has its base electrode 120 connected, via conductor 122 and series resistor 124, to collector 114 as at a point between collector 114 and resistor 116. A second resistor 126 serves to electrically connect conductor 20 base conductor 122 as at a point generally between resistor 116 and resistor 124. A capacitor 128 is so arranged as to have one of its sides electrically connected to conductor means 122 as at a point between base electrode 120 and resistor 124 while its other side is electrically connected to conductor 20. Emitter 130 of transistor 38 is connected via serially arranged conductor 132, resistor 134 and conductor 136 to conductor 22 while the collector electrode 138 is electrically connected to conductor 20 as by conductor means 140.

Transistor 40 has its base electrode 142 connected, via conductors 144, 146 and a series resistor 148 to conductor means 150 while the emitter electrode 152 thereof is electrically connected to conductor 22 via conductor 154. As shown, conductor 132, connected to emitter 130 of of transistor 38, is connected to conductor 146 via conductor 156. The collector electrode 158 is connected to conductor 20 through a series resistor 160.

Transistor 42 has its emitter electrode 162 connected to conductor 22 through a series resistor 164 while its collector electrode 166 is connected directly to conductor 20. The base terminal or electrode 168 is connected to conductor means 170, including oppositely poled diodes 172 and 174, to the base electrode 176 of transistor 48 which, similarly, has its emitter electrode 178 connected to conductor 22 through a resistor 180 and its collector electrode 182 connected directly to conductor 20. A resistor 184 is provided as to have one end thereof electrically connected to the base electrode 168 of transistor 42 while the other end thereof is connected to conductor 22. A capacitor 186 is so arranged as to have one side thereof connected to conductor 22 while the other side thereof is electrically connected to a point as between resistor 184 and base electrode 168. Additionally, conductor means 170 is electrically connected, as by means of a conductor 188, to the collector electrode 158 of transistor 40.

Transistors 44 and 46 hace their respective emitter electrodes 190 and 192 connected as to a common terminal at one end of a resistor 194 which, in turn, has its other end connected to conductor 22. The collector electrodes 196 and 200 of transistors 44 and 46 are each connected to conductor 20 with collector 196 being in series with a resistor 198. The base electrode 202 of transistor 44 is connected to emitter 162 via conductor means 204 while the base electrode 206 of transistor 46 is connected to emitter 178 via conductor means 208.

Conductor means 210, including series resistance means 212, has one end connected to a point as between collector 196 and resistor 198 while its other end is connected to the base terminal 214 of transistor 50. The emitter 216 of transistor 50 is connected via conductor 218 to conductor 22 while the collector 220 thereof is connected through a series resistor 222 to conductor 20.

Referring to section 18, it can be seen that conductor means 150, which includes oppositely poled diodes 224 and 226, has its opposite ends respectfully connected to base electrodes 228 and 230 of transistors 52 and 58. A resistor 232 is so situated as to have its first end electrically connected to the base electrode 228 while its other end is connected to conductor 22a. A capacitor 234 is arranged generally in parallel to resistor 232 in order to have one of its sides connected to base 228 while its other side is connected to conductor 22a. The collecotr 236 of transistor 52 is directly connected to conductor 20a while the emitter 238 thereof is connected to conductor 22a via series resistor 240.

The respective emitter electrodes 242 and 244 of transistors 54 and 56 are connected to a common terminal as at one end of a resistor 246 which has its other end connected to conductor 22a. The respective collectors 248 and 250 are each connected to conductor 20a with the exception that collector 248 is connected through series resistor 252. The base electrode 254 of transistor 54 is connected via conductor means 256 to emitter 238 and resistor 240 as at a point therebetween, while base terminal 258 of transistor 56 is connected via conductor means 260 to emitter 262, of transistor 58, and a resistor 264 as at a point therebetween. The collector terminal 266 of transistor 58 is connected to conductor 20a.

Conductor means 268, including a series resistor 270, has one end connected to collector 248, of transistor 54, and resistor 252 as at a point therebetween while its other end is connected to the base electrode 272 of transistor 60 which has its emitter 274 connected to conductor 22a and its collector electrode 276 connected to conductor 20a via series resistor 278.

First output signal receiving means 280 has one side connected, via conductor means 282, to a point generally between collector 220 and resistor 222 while its other side is connected, as by conductor means 284, to conductor 22a. Similarly, second output signal receiving means 286 has one side connected, via conductor means 288, to a point shown to be generally to be between collector 276 and resistor 278 while its other side is connected, as by conductor means 290, to conductor 22a. As will become apparent, devices 286 and 280 may be any suitable signal receiving means such as, for example, guages, electrical servo devices or systems, amplifiers and/or controls.

FIG. 1 also, somewhat schematically, depicts a related electrical pulse generating system comprised of a wheel-like menber 292 rotatable in accordance with the speed of a related structure to be guaged, and a magnetic probe assembly 294 including a winding 296 having respective opposite electrical leads 298 and 300 which are respectively connected to the base electrode 64 of transistor 30 and to conductor 22. As is shown, wheel 292 has a plurality of equally angularly spaced radially extending lobes 302 which upon passing in close proximity to the magnetic probe 304 causes a magnetic field to be build and collapse thereby inducing a voltage signal in the field winding 296.

OPERATION OF THE INVENTION

Before progressing to the specific operation of the invention, it should first be noted that in the preferred form of the invention the various transistors employed are of the N-P-N type. During normal conduction, in the N-P-N type, the emitter will be negative with respect to both the base and collector while the collector is positive with respect to both the emitter and base.

Now, let it be assumed that the invention as herein disclosed has been operating and that specific consideration of the operation thereof will start with the generation of the signal pulse by the passing of one of the lobes 302, in close proximity, to the probe assembly 294. Immediately prior to the start of the signal pulse, transistor 30 will be considered "off" or nonconductive while transistors 32, 34, 36 and 38 will be considered "on" or conductive.

As the signal pulse is generated, conductor 298 and base terminal 64 of transistor 30 will become positive with respect to emitter 66 thereby causing transistor 30 to become conductive and completing a circuit through the collector 62 and emitter 66 thereof and ultimately to general conductor 22 as through a resistor 70. The resistance values of respective resistors is such that when the circuit through collector 62 and emitter 66 is completed, the voltage at base 74 of transistor 32 may be considered as being reduced to almost ground potential thereby eliminating the previously established forward bias on the base-emitter junction of transistor 32. Consequently, transistor 32 is turned off opening the previous circuit through collector 82 and emitter 78 thereof.

However, it should be noted that while transistor 32 was previously on, capacitor 90 was at a fully charged condition with the right side thereof being positive (+) and the left side thereof being negative (−) because the left side of the capacitor was brought to the potential of ground conductor 22 through the closed circuit of collector 82 and emitter 78. Consequently, when transistor 32 is turned off as described above, capacitor 90 starts to discharge through resistors 92 and 84 until completely discharged. However, since transistor 34 is an N-P-N type, transistor 34 still continues to be on, with the collector 98 emitter 94 circuit thereof conducting, because in either situation, that is where capacitor 90 is charged positive on the right and negative on the left or where capacitor 90 is discharging as described above, base 86 of transistor 34 is still sufficiently positively biased to maintain current flow through the base-emitter thereof as well as the collector-emitter thereof.

The above conditions continue until the generated pulse signal to transistor starts to negative. When this happens the forward bias on transistor 30 is eliminated and transistor 30 becomes turned off with the result that base 74, through resistors 68 and 76, is again made positive with respect to emitter 74 thereby turning transistor 32 on making the circuit through collector 82 and emitter 78 conductive.

However, it will be remembered that immediately prior to being turned on transistor 32 was off and that at the end of such off condition capacitor 90 was completely discharged. Therefore, when transistor 32 is again turned on as described above, current flows not only through resistor 84 and collector-emitter of transistor 32 but also through resistor 92, capacitor 90 and collector-emitter of transistor 32. Such current flow through capacitor 90 causes, for a very brief period, base 86 of transistor 34 to become negative thereby eliminating the forward bias on the base 86 emitter 94 junction is again re-established and transistor 34 again becomes conductive.

When transistor 34 was in its first on state, capacitor 106 was in a fully charged condition with the right side thereof being positive (+) and the left side being negative (−) because it was, at that time, connected directly to ground potential of conductor 22 by means of the circuit completed through collector 98 and emitter 96 of transistor 34. Therefore, when transistor 34 was in its first on state, the base 102 of transistor 36 was also positive (+) with respect to emitter 110 causing the transistor 36 to be forwardly biased into conduction, or on, with current flow through its collector 114 and emitter 110.

When transistor 34 first switches from its first on state to its off state, as described above, transistor 36 still remains on because of the charged condition of capacitor 106 at the instant that transistor 34 was switched off. Consequently, when transistor 34 was thusly turned off, capacitor 106 starts to discharge through resistors 108 and 100 until completely discharged. However, since transistor 36 is an N-P-N type, transistor 36 still continues to be on, with the collector 114 emitter 110 circuit thereof conducting, because in situation, that is where capacitor 106 is charged positive on the right and negative on the left or where capacitor 106 is discharging as described above, base 102 of transistor 36 is still sufficiently positively biased to maintain current flow through the base-emitter thereof as well as the collector-emitter thereof.

Now, when transistor 34 is switched from its off state to its second on state as described above, a direct circuit is completed from ground conductor 22 through emitter 94 and collector 98 to the left side of capacitor 106 thereby placing such left side at essentially ground potential and causing current flow not only through resistor 100 and collector 98 emitter 94 but also through resistor 108, capacitor 106 and collector 98 emitter 94. Consequently, capacitor 106 starts to charge again. Such current flow through capacitor 106 causes, for a very brief period, base 102 of transistor 36 to become negative thereby eliminating the forward bias on the base-emitter junction of transistor 36 causing transistor 36 to be turned off for as long as such forward bias is removed. Once capacitor 106 becomes sufficiently charged (for example 0.6 volts) the forward bias on the base 102 emitter 110 junction is again re-established and transistor 36 again is turned on and becomes conductive.

When transistor 36 was in its first on state a circuit was completed through the collector 114 and emitter 110 thereof causing the juncture of resistors 116, 126 and 124 to be essentially at ground potential of conductor 22; this, in turn, caused capacitor 128 to start charging so that at the end of such first on state the capacitor 128 was fully charged with the upper side thereof at positive (+) potential while the lower side thereof was at negative (−) potential. When transistor 36 was then switched to its off state, the circuit through collector 114 and emitter 110 was closed thereby causing base 120 of transistor 38 to be made positive (via resistor 124 and resistors 116 and 126) with respect to emitter 130 with an accompanying current flow through resistors 116, 126, 124 and base 120. However, at this time the capacitor 128 is also discharging through resistors 126, 124 thereby adding to the current flow therethrough. Such current flow, of course, causes the collector-emitter diode of transistor 38 to conduct to a greater extent resulting in a proportionately greater voltage drop across resistor 134 which may be considered as a variable output signal voltage $V_o$ on conductor 156. For ease of consideration, the transistor 38 may be considered as continually operating at various points of and along the slope of its characteristic operating curve.

When transistor 36 is switched from its off state to its second on state, as previously described, the circuit is again completed through collector 114 and emitter 110 thereof and capacitor 128 starts to charge up again. Because of such charging of capacitor 128 transistor 38 is held on for some period of time but the degree to which transistor 38 is so conductive of course diminishes as capacitor 128 more nearly approaches its charged condition. Because of the time constants involved in capacitor 128, resistor 124 and resistors 116, 126 and the speed of rotation of pulse generating wheel 292, it may very well be the case that before capacitor 128 reaches a particular value of charge which would otherwise cause transistor 38 to be turned off, transistor 36 is again switched off causing transistor 38 to again be turned on to a greater degree including, of course, the discharging of capacitor 128. In view of the foregoing, and as will become even more apparent as the description progresses, transistor 38 may be considered as pulse averaging means. In any event, a variable voltage $V_o$ is supplied as on conductor 156 which is applied to the base 142 of transistor 40 which, as should be evident, acts as an inverter so that the voltage, $V_s$, across resistor 160 is proportional and indicative of the speed of rotation of pulse generating wheel 292 while being relative to the positive (+) potential of the supply 28.

Such speed signal or voltage, $V_s$, is applied to the base 168 emitter 162 of transistor 42 via conductor means 188 and 170 and diode 172 as well as the base 176 emitter 178 of transistor 48 via conductor means 188, 170 and diode 174. With respect to transistor 42, an R-C network, comprised of capacitor 186 and resistor 184, is provided between ground conductor 22 and base 168 of transistor 42. Accordingly, when the speed voltage across resistor 160 changes, the voltage at base 168 of transistor 42 will tend to remain what it previously was while the voltage at base 176 of transistor 48 will immediately start to change.

For example, in a quiescent state with the voltage across resistor 160 being constant, there will be some degree of current flow through the base-emitter of transistor 42 as well as through the collector-emitter thereof; also, at this time there will be the same degree of current flow through the base-emitter of transistor 48 as well as through the collector-emitter diode thereof. Also, during such a quiescent state, capacitor 186 becomes charged so that the upper side thereof is of positive (+) potential while the lower side thereof is of ground or negative (−) potential. During such a quiescent state transistors 44 and 46 may also be in a relatively low state of conduction (substantially equal to each other) and, depending upon the relative values of resistors 198, 194 and 212, transistor 50 will be conducting through its collector 220 emitter 216 diode.

However, during acceleration of pulse generating wheel 292 (for purposes of discussion, let it be assumed that rapid acceleration to a second faster speed is experienced), the value of the speed signal voltage, $V_s$, across resistor 160 starts increasing with the lower terminal of resistor 160 becoming more negative because of transistor 40 going into greater conduction. As the value of speed signal voltage, $V_s$, increases, transistor 48 immediately responds thereto by at least reducing its degree of conduction (if not entirely turning off) through its collector 182 emitter 178 diode thereby also causing transistor 46 to follow it by also at least reducing the degree of conduction through its collector 200 emitter 192 diode. However, the response of transistor 42 to the changing value of speed voltage, $V_s$, lags the response of the transistor 48 because of the R-C network comprised of resistor 184 and capacitor 186. That is, as conductor 188 becomes more negative (or less positive) due to the increase in speed, base terminal 168 is temporarily precluded from "seeing" such a reduced positive potential because capacitor 186 starts to discharge thereby holding transistor 42 in the previously established degree of conduction.

Consequently, while transistor 46 is being turned off or reduced in its degree of conduction, transistor 44 is permitted to remain on for a period of time resulting in substantially all current flow passing through resistor 198. As a result of this the juncture of conductor 210 and resistor 198 is brought sufficiently close to ground or negative (−) potential causing transistor 50 to be turned off. (In actual practice, the values of the various resistors may be such as to cause transistor 50 to experience a reduction in its degree of conduction and not be completely turned off.) In any event, whether transistor 50 be thusly partially or completely turned off, current flow is directed during such time, via conductor means 282, to suitable related receiving means 281 which may be comprised of any suitable apparatus devices, or instrumentation such as, but not limited to, gauge means 280 which would be energized by the current and/or voltage thereacross as supplied via conductor means 282.

When acceleration is terminated, and a quiescent or steady state is again achieved, transistor 50 again is turned on to a greater (or even fully on) state of conduction.

Generally, in view of the above, it can be seen that the invention discloses electrical circuit means effective for producing an electrical output indicative and related to the parameter to the rate of change of speed and that, among other things, the circuit is comprised of amplifiers and pulse shapers, transistors 30 and 32; a tachometer circuit which includes transistors 34, 36 and 38 with transistors 34 and 36 comprising a monostable multivibrator and transistor 38 comprising a pulse averager; and a comparator circuit 16 which is effective for comparing the value of a particular voltage developed during acceleration to the value of the speed voltage immediately prior to the occurrence of the acceleration.

Further, it can be seen that resistor 92 and capacitor 90 define timing means for determining the time or duration that transistor 34 is off as well as comprising a pulse coupling network from transistor 32 to transistor 34. Capacitor means such as at 118 may be employed for better shaping the pulse curves and making such sharper in action. Resistor 108 and capacitor 106, in addition to serving as a pulse coupling network, collectively define a time constant determining the off time of transistor 36. Additionally the R-C network of 186 and 184 is at least to some degree responsive to the value of the speed from which the acceleration takes place. That is, at lower steady state speeds the lower terminal of resistor 160 will be at a potential more nearly the value of the positive potential of conductor 24 (such value of potential being transmitted to the upper side of capacitor 186) then at higher speeds. Further, the effectiveness of capacitor 186 in holding transistor 42 on is progressively diminished as the length of time of acceleration increases.

In addition to the above, the invention also contemplates the provision of a second comparator circuit section 18 which functions in the same manner as did section 16 except that it does so with response to deceleration. In order to do this, the output from transistor 38 is not first passed through an inverter such as transistor 40 but rather directly supplied to section 18.

For sake of brevity, it can be stated generally that: (a) transsistors 52, 54, 56, 58 and 60 of section 18 functionally correspond to transistors 42, 44, 46, 48 and 50, respectively, of section 16 in their mode of operation; (b) R-C circuit comprised of resistor 232 and capacitor 234 corresponds to R-C circuit comprised of resistor 184 and capacitor 186; (c) diodes 224 and 226 correspond to diodes 172 and 174; (d) resistors 240, 252, 246, 270, 264 and 278 respectively correspond to resistors 164, 198, 194, 212, 180 and 222; and (e) conductor means 288 and output signal receiving means 286 respectively correspond to conductor means 282 and means 280.

In a quiescent state, the operation of the elements within section 18 is like that of the elements in previously described section 16. In comparing sections 16 and 18 it can be seen that the primary difference lies in the fact that in section 16 the respective bases of transistors 42 and 48 are connected to what might be considered a "variable negative potential" at the lower end of resistor 160 while in section 18 the respective bases 228 and 230 of transistors 52 and 58 are connected to what might be considered a "variable positive potential" at the right end of resistor 134.

However, the remaining operation of sections 16 and 18 is the same in that when deceleration occurs, the value of the positive potential on conductor 156 decreases and such is transmitted via conductors 146, 150 to bases 228 and 230 of transistors 52 and 58 with transistor 58 immediately responding to such while transistor 52, because of the discharging of capacitor 234, lags in its response. Such a lag, in turn, through the continued conduction of transistor 54, causes transistor 60 to either fully or partly turn off resulting in current flow through conductor means 288 and related means 286.

Figure 7:
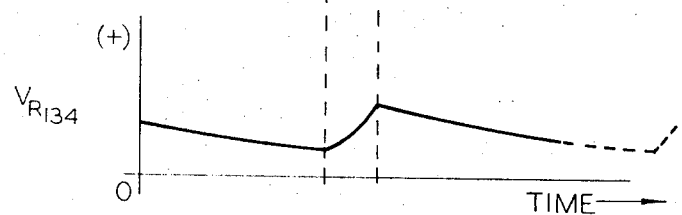

FIGS. 2, 3, 4, 5, 6 and 7, positioned above each other and of a constant time scale, illustrate the operating curves of the pulse generating means 292, 294 and the potential across the base-emitter of transistor 30 (FIG. 2), the collector voltage of transistor 30 (FIG. 3), the collector voltage of transistor 32 (FIG. 4), the collector voltage of transistor 34 (FIG. 5), the collector voltage of transistor 36 (FIG. 6), and the voltage across resistor 134 (FIG. 7).

Although only one preferred embodiment of the invention has been specifically disclosed and described it is apparent that other embodiments and modifications of the invention, including but not restricted to the practice of the invention by employing either or both of the acceleration and deceleration portions of the invention, are possible within the scope of the appended claims.

I claim:

1. A method of sensing and creating an output responsive to the occurrence of a rate of change in a parameter of speed, comprising the steps of creating first electrical pulses in a relationship of timed frequency with respect to said parameter of speed, amplifying said first electrical pulses into second amplified electrical pulses, producing a control voltage of a value dependent upon and related to said second amplified electrical pulses, employing the control voltage as an indication of the then value of said speed, applying the control voltage to two electrically responsive sensing means, and preventing one of the sensing means from responding to the output voltage whenever a change in the parameter of speed occurs while permitting the other sensing means to respond thereto thereby creating a triggering voltage to control the action of an output switch so that the output switch becomes responsive to such a condition of change of speed.

2. A method according to claim 1, and further comprising the step of electrically shaping the first electrical pulses in order to develop corresponding pulses of a squared wave form configuration.

3. A method according to claim 2, wherein said step of shaping the first electrical pulses is performed immediately prior to producing said control voltage.

4. A method according to claim 2, wherein said squared wave pulses are employed to cyclically switch related switching means to and from a conductive state in order to thereby produce a related saw-tooth like intermediate output voltage, and wherein said control voltage is determined directly from the value of said saw-tooth like intermediate output voltage.

5. Circuit means for detecting and responding to the rate of change of speed, comprising first means for creating first electrical pulses in a relationship of timed frequency with respect to said speed, second means for developing a control voltage of a value related to said frequency of said first electrical pulses, third means for receiving said control voltage, said third means comprising first and second portions each of which has said control voltage applied thereto, output means for developing an electrical output to be applied to related receiving means, said output means being maintained in a first state whenever said first and second portions sense the same value of said control voltage, and additional means effective for at least temporarily preventing one of said first and second portions from sensing the changing value of said control voltage as the value of said speed is undergoing a change.

6. Circuit means according to claim 5, wherein said first means comprises a pulse generator continually driven in accordance with said speed.

7. Circuit means according to claim 5, wherein said first means comprises a magnetic type pulse generator driven in accordance with said speed, and transistor means triggered in accordance with the pulses created by said pulse generator to create amplified operating pulses.

8. Circuit means according to claim 5, wherein said second means comprises a tachometer circuit including monostable multivibrator means.

9. Circuit means according to claim 5, wherein said first means comprises a magnetic type pulse generator driven in accordance with said speed, first transistor means triggered in accordance with the pulses created by said pulse generator to create amplified operating pulses, and wherein said second means comprises a tachometer circuit including monostable multivibrator means, said monostable multivibrator means being acted upon and responsive to said amplified operating pulses.

10. Circuit means according to claim 9 wherein said monostable multivibrator comprises second and third transistor means, wherein said second and third transistor means are effective for producing intermediate actuating voltage pulses related to said amplified operating pulses, and wherein said tachometer circuit further comprises fourth transistor means and resistance means electrically coupled thereto, the conductivity of said fourth transistor being controlled by said intermediate actuating voltage pulses so that as said conductivity increases said resitance means becomes effective for creating said control voltage of a correspondingly increased value.

11. Circuit means according to claim 5, wherein said third means comprises a differential amplifier.

12. Circuit means according to claim 5, wherein said third means comprises a differential amplifier, and wherein said additional means comprises an R-C circuit coupled to said one of said first and second portions.

13. Circuit means according to claim 5, wherein said output means comprises a transistor having a base terminal electrically connected to said third means.

14. Circuit means according to claim 5, wherein said first means comprises a magnetic type pulse generator driven in accordance with said speed, first transistor means triggered in accordance with the pulses created by said pulse generator to create amplified operating pulses, wherein said second means comprises a tachometer circuit including monostable multivibrator means, said monostable multivibrator means being acted upon and responsive to said amplified operating pulses, said monostable multivibrator means comprising second and third transistor means effective for producing intermediate actuating voltage pulses related to said amplified operating pulses, said tachometer circuit further comprising fourth transistor means and resistance means electrically coupled thereto, the conductivity of said fourth transistor being controlled by said intermediate actuating voltage pulses so that as said conductivity increases said resistance means becomes effective for creating said control voltage of a correspondingly increased value, therein said third means comprises a differential amplifier with fifth and sixth transistor means, wherein said additional means comprises R-C circuit means coupled to said fifth transistor means, and wherein said output means comprises seventh transistor meand electrically connected and responsive to said differential amplifier.

15. Circuit means according to claim 5, wherein said additional means is effective for at least temporarily preventing one of said first and second portions from sensing the changing value of said control voltage only when the value of said speed is increasing.

16. A circuit for determining and responding to a rate of change of speed, comprising a source of electrical potential, first conductor means electrically connected to one electrical side of said source, second conductor means electrically connected to another side of said source, a first transistor having first collector emitter and base terminals, a second transistor having second collector emitter and base terminals, a third transistor having third collector emitter and base terminals, a fourth transistor having fourth collector emitter and base terminals, a fifth transistor having fifth collector emitter and base terminals, a sixth transistor having sixth collector emitter and base terminals, a seventh transistor having seventh collector emitter and base terminals, an eighth transistor having eighth collector emitter and base terminals, a ninth transistor having ninth collector emitter and base terminals, a tenth transistor having 10th collector emitter and base terminals, an eleventh transistor having 11th collector emitter and base terminals, each of said collector terminals being electrically connected to said first conductor means, each of said emitter terminals being electrically connected to said second conductor means, first resistance means interposed between said fifth emitter terminal and said second conductor means, second resistance means interposed between said sixth collector terminal and said first conductor means, a pulse generator driven in accordance with said speed electrically coupled to said first base terminal, said second base terminal being electrically connected to said first collector terminal, a first pulse coupling network for electrically coupling said third base terminal to said second collector terminal, a second pulse coupling network for electrically coupling said fourth base terminal to said third collector terminal, said fifth base terminal being electrically connected to said fourth collector terminal, said sixth base terminal being electrically connected to said fifth emitter terminal at a point generally electrically between said first resistance means and said fifth emitter terminal, said eighth base terminal being electrically connected to said seventh emitter terminal, said ninth base terminal being electrically connected to said 10th emitter terminal, first circuit means electrically interconnecting said seventh and tenth base terminals to each other and to said sixth collector terminal generally electrically between said second resistance means and said sixth collector terminal, said 11th base terminal being electrically connected to said eighth collector terminal, R-C circuit means electrically connected to said sixth base terminal and said second conductor means, and second circuit means electrically connected to said eleventh collector and leading to related signal receiving means for responding to said rate of change of speed as sensed by said pulse generator.

17. A circuit according to claim 16, and further comprising a 12th transistor having twelveth collector emitter and base terminals, a 13th transistor having thirteenth collector emitter and base terminals, a 14th transistor having 14th collector emitter and base terminals, a 15th transistor having fifteenth collector emitter and base terminals, a 16th transistor having sixteenth collector emitter and base terminals, said 12th, 13th, 14th, 15th and 16th collector terminals each being electrically connected to said first conductor means, said 12th, 13th, 14th, 15th and 16th emitter terminals each being electrically connected to said second conductor means, said 13th base terminal being electrically connected to said 12th emitter terminal, said 14th base terminal being electrically connected to said 15th emitter termina, third circuit means electrically interconnecting said 12th and 15th base terminals to each other and to said 5th emitter terminal, second R-C circuit means electrically connected to said 12th base terminal and said second conductor means, said 16th base terminal being electrically connected to said 13th collector terminal, and 4th circuit means electrically connected to said 16th collector and leading to said related signal receiving means.

18. A circuit according to claim 16, wherein said first coupling network comprises first capacitor means interposed between said third collector terminal and said fourth base terminal.

19. A circuit according to claim 16, and further comprising capacitor means having one electrical side thereof electrically connected to said first conductor means and a second electrical side of said capacitor means being electrically connected to said fifth base terminal.

* * * * *